United States Patent
Hwang

(10) Patent No.: US 12,218,317 B2
(45) Date of Patent: *Feb. 4, 2025

(54) BATTERY PACK WITH OPTICAL COMMUNICATION BETWEEN MASTER BMS AND SLAVE BMS

(71) Applicant: LG ENERGY SOLUTION, LTD., Seoul (KR)

(72) Inventor: Ji-Won Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 702 days.

This patent is subject to a terminal disclaimer.

(21) Appl. No.: 17/420,250

(22) PCT Filed: Sep. 17, 2020

(86) PCT No.: PCT/KR2020/012582
§ 371 (c)(1),
(2) Date: Jul. 1, 2021

(87) PCT Pub. No.: WO2021/060775
PCT Pub. Date: Apr. 1, 2021

(65) Prior Publication Data
US 2022/0069363 A1 Mar. 3, 2022

(30) Foreign Application Priority Data

Sep. 26, 2019 (KR) ........................ 10-2019-0119187

(51) Int. Cl.
*H01M 10/42* (2006.01)
*H01M 10/44* (2006.01)

(52) U.S. Cl.
CPC ....... *H01M 10/425* (2013.01); *H01M 10/441* (2013.01); *H01M 2010/4271* (2013.01); *H01M 2220/20* (2013.01)

(58) Field of Classification Search
None
See application file for complete search history.

(56) References Cited

U.S. PATENT DOCUMENTS 7,683,576 B2  3/2010 Tien et al.
2007/0230965 A1  10/2007 Horio
(Continued)

FOREIGN PATENT DOCUMENTS

CN   103178580 A   6/2013
CN   203205954 U   9/2013
(Continued)

OTHER PUBLICATIONS

Extended European Search Report dated Jul. 8, 2022 issued by the European Patent Office in corresponding European Patent Application No. 20868278.1.
(Continued)

*Primary Examiner* — Jonathan G Leong
*Assistant Examiner* — Tony S Chuo
(74) *Attorney, Agent, or Firm* — Morgan, Lewis & Bockius LLP

(57) ABSTRACT

A battery pack according to an embodiment of the present disclosure includes: a communication module configured to block light between an inside and an outside, the communication module including a master light emitting unit and a slave light receiving unit in the inside, the slave light receiving unit being configured so that a first signal output from the master light emitting unit is input thereto; a master BMS connected to the master light emitting unit and configured to output the first signal by flickering the connected master light emitting unit; and a slave BMS connected to the slave light receiving unit and configured to change an operation mode thereof when the slave light receiving unit receives the first signal from the master light emitting unit.

11 Claims, 6 Drawing Sheets

(56) References Cited

U.S. PATENT DOCUMENTS

| | | |
|---|---|---|
| 2012/0025769 A1 | 2/2012 | Kikuchi et al. |
| 2013/0108898 A1 | 5/2013 | Potts et al. |
| 2013/0149578 A1 | 6/2013 | Uchida |
| 2013/0193925 A1 | 8/2013 | Abe et al. |
| 2013/0214601 A1 | 8/2013 | Yang |
| 2014/0210420 A1 | 7/2014 | Lee et al. |
| 2017/0351561 A1 | 12/2017 | Yamazone et al. |
| 2019/0101598 A1 | 4/2019 | Cho et al. |
| 2019/0229376 A1 | 7/2019 | Petrakivskyi et al. |
| 2019/0229518 A1 | 7/2019 | Ronne et al. |

FOREIGN PATENT DOCUMENTS

| | | |
|---|---|---|
| DE | 10 2017 223 665 A1 | 6/2019 |
| JP | H06-069530 A | 3/1994 |
| JP | H11-287932 A | 10/1999 |
| JP | 2010-228523 A | 10/2010 |
| JP | 2012-085491 A | 4/2012 |
| JP | 2013-050312 A | 3/2013 |
| JP | 2013-251410 A | 12/2013 |
| JP | 2014-143771 A | 8/2014 |
| JP | 6463371 B2 | 1/2019 |
| KR | 10-0835492 B1 | 6/2008 |
| KR | 10-2010-0074994 A | 7/2010 |
| KR | 10-1710454 B1 | 2/2017 |
| KR | 10-2018-0023647 A | 3/2018 |
| KR | 10-2018-055181 A | 5/2018 |
| KR | 10-2019-0085912 A | 7/2019 |
| KR | 10-2019-0089401 A | 7/2019 |

OTHER PUBLICATIONS

International Search Report issued in corresponding International Patent Application No. PCT/KR2020/012582, dated Dec. 17, 2020.
Office Action dated Aug. 10, 2024 issued in corresponding Chinese Patent Application No. 202080031445.X.

BATTERY PACK WITH OPTICAL COMMUNICATION BETWEEN MASTER BMS AND SLAVE BMS

TECHNICAL FIELD

The present application claims priority to Korean Patent Application No. 10-2019-0119187 filed on Sep. 26, 2019 in the Republic of Korea, the disclosures of which are incorporated herein by reference.

The present disclosure relates to a battery pack, and more particularly, to a battery pack allowing effective communication between a master BMS and a slave BMS.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance second batteries allowing repeated charging and discharging are being actively studied.

Secondary batteries commercially available at present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-charging rate and high energy density.

Batteries are used in various fields, and the fields in which batteries are widely used in recent years, such as electric vehicles or smart grid systems, often require large capacity. In order to increase the capacity of a battery pack, it is possible to increase the capacity of the secondary battery, namely the battery cell itself. However, in this case, the capacity is not largely increased, there is a physical limitation on the size of the secondary battery, and management is inconvenient. Therefore, a battery pack in which a plurality of battery modules are connected in series and in parallel is widely used.

Meanwhile, as the need for a battery pack with a large-capacity structure has recently increased, the demand for a battery pack having a multi-module structure in which a plurality of battery modules are connected in series and/or in parallel is increasing.

Since the battery pack having a multi-module structure includes a plurality of batteries, there is a limit to controlling the charging and discharging states of all batteries using a single BMS (Battery Management System). Therefore, recently, a BMS is installed for each battery module included in the battery pack, one of the BMSs is designated as a master BMS and the remaining BMSs are designated as slave BMSs, and then charging and discharging of each battery module is performed by a master-slave method.

In the master-slave method, in order to manage the charge/discharge of the battery modules included in the battery pack, the master BMS communicates with a slave BMS to collect various charge/discharge monitoring data for the battery module in charge of the slave BMS or transmit a control command to the corresponding slave BMS to control the charging/discharging operation of each battery module.

Conventionally, when the master BMS wants to change the operation mode of the slave BMS, the master BMS reads identification information of the slave BMS using a wired or wireless communication network and then changes the operation mode of each slave BMS by a program algorithm. The conventional battery pack structure has a disadvantage in that a hardware circuit structure is complex for communication between the plurality of slave BMSs and the master BMS, and a high-performance processor is required to execute a complex software algorithm.

DISCLOSURE

Technical Problem

The present disclosure is designed to solve the problems of the related art, and therefore the present disclosure is directed to providing a battery pack allowing effective communication between a master BMS and a slave BMS.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a communication module configured to block light between an inside and an outside, the communication module including a master light emitting unit and a slave light receiving unit in the inside, the slave light receiving unit being configured so that a first signal output from the master light emitting unit is input thereto; a master BMS connected to the master light emitting unit and configured to output the first signal by flickering the connected master light emitting unit; and a slave BMS connected to the slave light receiving unit and configured to change an operation mode thereof when the slave light receiving unit receives the first signal from the master light emitting unit.

The communication module may be configured to be attachable to and detachable from the battery pack.

When being attached to the battery pack, the communication module may be configured to electrically connect one end of the master light emitting unit and one end of the master BMS and electrically connect one end of the slave light receiving unit and one end of the slave BMS.

The slave BMS may be provided in plural inside the battery pack.

The communication module may be configured to include at least one master light emitting unit and a plurality of slave light receiving units corresponding to the plurality of slave BMSs.

The communication module may include a plurality of master light emitting units to correspond to the plurality of slave light receiving units, and may further include a first barrier disposed between the plurality of master light emitting units.

The communication module may further include a plurality of slave light emitting units and a plurality of master light receiving units to which a second signal output from a corresponding slave light emitting unit among the plurality of slave light emitting units is input, in the inside.

The plurality of slave BMSs may be respectively connected to a corresponding slave light emitting unit among the plurality of slave light emitting units and configured to output the second signal by flickering the connected slave light emitting unit.

The master BMS may be connected to the plurality of master light receiving units and configured to determine whether each of the plurality of slave BMSs has a failure depending on whether the second signal is input to each of the plurality of connected master light receiving units.

The communication module may further include a second barrier disposed between the plurality of master light emitting units and the plurality of master light receiving units.

The communication module may further include a reflection member disposed to at least one of an inner wall of the communication module, an outer wall of the first barrier and an outer wall of the second barrier to reflect light.

The communication module may further include a plurality of slave light emitting units corresponding to the plurality of slave BMSs, in the inside.

The plurality of slave BMSs may be connected to a corresponding slave light emitting unit among the plurality of slave light emitting units and be configured to change the operation modes thereof and then output the first signal by flickering the connected slave light emitting unit when the connected slave light receiving unit receives the first signal.

The communication module may further include a master light receiving unit configured to receive a signal output from the corresponding slave light emitting unit among the plurality of slave light emitting units.

The master BMS may be connected to the master light receiving unit and configured to output a third signal by flickering the master light emitting unit and then diagnose a state of the communication module depending on whether the third signal is input to the master light receiving unit.

A vehicle according to another embodiment of the present disclosure may comprise the battery pack according to an embodiment of the present disclosure.

Advantageous Effects

According to an aspect of the present disclosure, since communication between the master BMS and the slave BMS is performed through signal transmission according to the immediate light emission and light reception, it is possible to prevent a communication delay phenomenon caused by communication interference between the master BMS and the slave BMS.

In addition, according to an aspect of the present disclosure, as the battery pack includes a detachable communication module, management, such as maintenance, of the light emitting unit and the light receiving unit may be facilitated.

In addition, according to an aspect of the present disclosure, since a communication module structure for effectively inputting light to the light receiving unit is adopted, optical communication may be made more efficiently between the master BMS and the plurality of slave BMSs.

Besides, the present disclosure may have various other effects, and other effects of the present disclosure will be understood by the following description and more clearly understood by the embodiments of the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Figure 1:
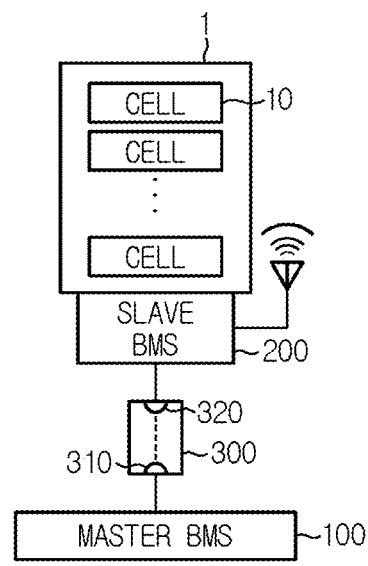
FIG. 1 is a diagram schematically showing a configuration of a battery pack according to an embodiment of the present disclosure.

FIG. 1 is a diagram schematically showing a configuration of a battery pack according to an embodiment of the present disclosure.

Referring to FIG. 1, the battery pack may include a battery module 1, a slave BMS 200, a communication module 300, and a master BMS 100.

Here, the battery module 1 may be a cell assembly including at least one battery cell 10. In addition, the battery cell 10 means an independent cell that has a negative electrode terminal and a positive electrode terminal and is physically separable. For example, one pouch-type lithium polymer cell may be regarded as the battery cell 10.

In addition, the slave BMS 200 may be electrically connected to the battery module 1 included in the battery pack. In this case, the slave BMS 200 may perform charge/discharge control, equalization control, switching, electrical characteristic value measurement and monitoring, error indication, on/off control, SOC (State Of Charge) estimation, or the like for the connected battery module 1.

In addition, the master BMS 100 may exchange electric signals with the slave BMS 200 using a wired or wireless communication network. That is, the master BMS 100 and the slave BMS 200 may exchange electric signals using a wired or wireless communication network as well as optical communication through the communication module 300, explained later. Preferably, the communication network connecting the master BMS 100 and the slave BMS 200 may be a wireless Wi-Fi (Wireless Fidelity) communication network or a CAN (Controller Area Network) communication network.

The communication module 300 included in the battery pack according to an embodiment of the present disclosure may be configured to block light between an inside and an outside. That is, the communication module 300 may have a closed structure in which light of the inside is not output to the outside and light of the outside is not input to the inside. For example, the communication module 300 may be a chamber formed in a polyhedral darkroom structure. Preferably, the communication module 300 may be a chamber formed in a hexahedral darkroom structure.

In addition, the communication module 300 may include a master light emitting unit 310 and a slave light receiving unit 320 in the inside.

Here, the master light emitting unit 310 may be configured as a light emitting element. For example, the master light emitting unit 310 may be implemented as a light emitting diode. In addition, the slave light receiving unit 320 may be configured as a light receiving element. For example, the slave light receiving unit 320 may be implemented as a light receiving diode.

Preferably, the master light emitting unit 310 may be attached to one surface of the communication module 300 formed in a multi-faceted darkroom structure. In addition, the slave light receiving unit 320 may be attached to a surface of the communication module 300 opposite to one surface to which the master light emitting unit 310 is attached.

For example, as in the embodiment of FIG. 1, the master light emitting unit 310 and the slave light receiving unit 320 may be attached at locations opposite to each other inside the communication module 300.

The slave light receiving unit 320 may be configured to receive a first signal output from the master light emitting unit 310.

Specifically, if the master light emitting unit 310 provided in the communication module 300 outputs the first signal by generating light, the slave light receiving unit 320 disposed at a position opposite to the master light emitting unit 310 may receive the output first signal. That is, the master light emitting unit 310 and the slave light receiving unit 320 may perform optical communication.

The master BMS 100 may be configured to be connected to the master light emitting unit 310. That is, the master BMS 100 may be electrically connected to the master light emitting unit 310 and may flicker the master light emitting unit 310. Here, flickering may mean that the master light emitting unit 310 blinks at least once by receiving a signal from the master BMS 100.

For example, it is assumed that an electric plate of the battery pack is formed as a printed circuit board. The master BMS 100 may be coupled on the printed circuit board and connected to the communication module 300 through a wiring provided on the printed circuit board or a separate line. Preferably, the master BMS 100 may be connected to the master light emitting unit 310 through the wiring provided on the printed circuit board.

Referring to the embodiment of FIG. 1, the communication module 300 may be provided in an area separate from the master BMS 100 and the slave BMS 200 inside the battery pack. That is, the communication module 300 may be electrically connected to the master BMS 100 and the slave BMS 200 through a wiring inside the battery pack or a separate input line or the like.

The master BMS 100 may be configured to output the first signal by flickering the connected master light emitting unit 310.

Here, the first signal is defined according to a preset rule and, for example, a flickering period and a flickering time may be predefined.

In addition, the first signal may be an operation mode change signal for changing the operation of the slave BMS 200. The operation mode change signal may be a signal for changing a BMS in a sleep mode state to an awake mode state. Alternatively, the operation mode change signal may be a signal for changing a BMS in an awake mode state to a sleep mode state. That is, the operation mode of the slave BMS 200 may include an awake mode and a sleep mode.

Specifically, the master BMS 100 may transmit an electric signal to the master light emitting unit 310. The master light emitting unit 310 may flicker to correspond to the electric signal received from the master BMS 100. That is, the master light emitting unit 310 may output the first signal by outputting light corresponding to the electric signal received from the master BMS 100.

The slave BMS 200 may be configured to be connected to the slave light receiving unit 320. That is, the slave BMS 200 may be electrically connected to the slave light receiving unit 320 and receive the electric signal from the slave light receiving unit 320.

For example, as in the former embodiment, it is assumed that the electric plate of the battery pack is formed as a printed circuit board. The slave BMS 200 is coupled onto the printed circuit board and connected to the communication module 300 through a wiring provided on the printed circuit board or a separate line. Preferably, the slave BMS 200 may be connected to the slave light receiving unit 320 through the wiring provided on the printed circuit board.

Referring to the embodiment of FIG. 1, the slave BMS 200 may be connected to the slave light receiving unit 320 provided in the communication module 300.

The slave BMS 200 may be configured to change the operation mode thereof, if the slave light receiving unit 320 receives the first signal from the master light emitting unit 310.

That is, if the slave light receiving unit 320 connected to the slave BMS 200 receives the first signal from the master light emitting unit 310, the slave BMS 200 may receive an electric signal corresponding to the first signal from the slave light receiving unit 320 that has received the first signal. In this case, the slave BMS 200 may be configured to change the operation mode.

As described above, the first signal output from the master light emitting unit 310 may be input to the slave light receiving unit 320. In addition, since the slave light receiving unit 320 and the slave BMS 200 are electrically connected, the slave BMS 200 may receive an electric signal corresponding to the first signal input to the slave light receiving unit 320. That is, if the slave BMS 200 receives a signal corresponding to the first signal output from the master light emitting unit 310 through the slave light receiving unit 320, the slave BMS 200 may change the operation mode.

For example, if a signal corresponding to the first signal is received when the slave BMS 200 is in a sleep mode, the slave BMS 200 may change the operation mode to an awake mode. Conversely, if the signal corresponding to the first signal is received when the slave BMS 200 is in an awake mode, the slave BMS 200 may change the operation mode to a sleep mode.

That is, since the battery pack according to an embodiment of the present disclosure performs optical communication through signal transmission according to light emission and light reception through the communication module 300, it is possible to prevent a communication delay caused by communication interference between the master BMS 100 and the slave BMS 200.

In addition, since the battery pack performs optical communication according to light emission and light reception, a standby power of the slave BMS 200 may be greatly reduced. For example, if the slave BMS 200 and the master BMS 100 communicate wirelessly, the slave BMS 200 must open a wireless communication channel in order to detect an input wireless signal. Therefore, the slave BMS 200 has a problem of consuming too much standby power for wireless communication. Meanwhile, the slave BMS 200 of the battery pack according to an embodiment of the present disclosure may detect a signal output from the master BMS 100 based on the received light signal of the slave light receiving unit 320. Therefore, the standby power of the slave BMS 200 may be greatly reduced.

In addition, since the slave light receiving unit 320 receives the light output from the master light emitting unit 310 inside the communication module 300 of a darkroom structure, it is possible to prevent a communication delay or malfunction in a wireless communication environment. In general, it can be said that the speed of radio waves is the same as the speed of light. Accordingly, in an optical communication environment using the master light emitting unit 310 and the slave light receiving unit 320, a communication delay may not occur, compared to the case in a wireless communication environment.

Meanwhile, each BMS included in the battery pack according to an embodiment of the present disclosure may include a processor and a memory device.

The processor may perform each operation of the battery pack. In addition, the memory device may store information necessary for operation of the battery pack in advance.

Meanwhile, the processor may be implemented to selectively include a processor known in the art, an application-specific integrated circuit (ASIC), another chipset, a logic circuit, a register, a communication modem and/or a data processing device in order to perform the operation described above.

Meanwhile, the memory device has no particular limitation on the type as long as it is a storage medium capable of recording and erasing information. For example, the memory device may be a RAM, a ROM, a register, a hard disk, an optical recording medium, or a magnetic recording medium. The memory devices may also be electrically connected to each processor through, for example, a data bus, so as to be accessed by the processor. The memory device may store and/or update and/or erase and/or transmit a program including various control logic executed by the processor and/or data generated when the control logic is executed.

The communication module 300 may be configured to be attachable to or detachable from the battery pack.

Referring to FIG. 1, the communication module 300 may be attached to the inside of the battery pack. Preferably, the communication module 300 may be attached to an area other than the area where the master BMS 100 and the slave BMS 200 are disposed, inside the battery pack.

For example, the communication module 300 may include a first terminal that may be connected to the master BMS 100 and a second terminal that may be connected to the slave BMS 200. In addition, the first terminal and the second terminal of the communication module 300 may be connected to an area provided in advance in the electric plate of the battery pack. Through this, the communication module 300 may be attached to the battery pack, connected to the master BMS 100 through the first terminal, and connected to the slave BMS 200 through the second terminal.

If the communication module 300 is attached to the battery pack, the master BMS 100 may be electrically connected to the master light emitting unit 310, and the slave BMS 200 may be electrically connected to the slave light receiving unit 320.

Since the communication module 300 including the master light emitting unit 310 and the slave light receiving unit 320 is attachable to and detachable from the battery pack, maintenance of the communication module 300 may be facilitated.

For example, it is assumed that the master light emitting unit 310 is provided in the master BMS 100 and the slave light receiving unit 320 is provided in the slave BMS 200, unlike the present disclosure. In this case, if the master light emitting unit 310 and/or the slave light receiving unit 320 is in a faulty state, there is a problem that the master BMS 100 and/or the slave BMS 200 itself needs to be replaced. That is, since the BMS itself needs to be replaced due to a failure of the light-emitting element and/or the light-receiving element, the replacement cost may be greatly increased compared to the case where the light-emitting element and/or the light-receiving element is replaced.

Meanwhile, the battery pack according to the present disclosure may be configured such that the communication module 300 is attachable thereto and detachable therefrom. In addition, if the communication module 300 is attached to the battery pack, the master BMS 100 and the master light emitting unit 310 may be connected through an internal wiring or a separate line, and the slave BMS 200 and the slave light receiving unit 320 may be connected. Therefore, as in the former embodiment, if the master light emitting unit 310 and/or the slave light receiving unit 320 is in a faulty state, the problem can be solved simply by replacing the communication module 300. Therefore, since the battery pack according to an embodiment of the present disclosure is configured so that the communication module 300 may be attached to or detached from the battery pack, the replacement cost of the communication module 300 may be reduced and maintenance may be facilitated.

If being attached to the communication module 300, the battery pack may electrically connect one end of the master light emitting unit 310 and one end of the master BMS 100.

As described above, the battery pack may have a separate area to which the communication module 300 may be attached. The communication module 300 is attached to the separate area provided in the battery pack, and terminals of the communication module 300 may be electrically connected to an internal wiring of the battery pack.

For example, the master BMS 100 and the slave BMS 200 may be coupled to the substrate of the battery pack. That is, pins of the master BMS 100 and the slave BMS 200 may be inserted into one substrate or different substrates, so that the master BMS 100 and the slave BMS 200 are electrically connected to each other inside the battery pack. For example, the pin of the master BMS may be inserted into an electric plate located above a plurality of battery modules, and the pin of the slave BMS may be inserted into a sensing substrate located in front of each battery module. In addition, insert terminals corresponding to the pins of the communication module 300 may be provided in a separate area provided in the battery pack. For example, a terminal for inserting the pin of the communication module may be provided to the electric plate, so that the communication module is mounted and connected to the electric plate. In addition, a substrate, for example the electric plate, of the battery pack may include an internal wiring for connecting the insert terminals and the master BMS 100. Therefore, the communication module 300 may be attached to the battery pack by inserting the pins of the communication module 300 into the corresponding insert terminals. In addition, if the communication module 300 is attached to the battery pack, the master BMS 100 and the master light emitting unit 310 may be connected.

As another example, the communication module 300 may have a pin directly connected to the master BMS 100, and the master BMS 100 may have an insert terminal into which the pin of the communication module 300 may be inserted. In addition, a predetermined coupling member to which the communication module 300 may be fixedly coupled may be provided on the substrate of the battery pack. In this case, if the communication module 300 is fixedly coupled to the coupling member on the substrate and the pin of the communication module 300 is connected to the insert terminal provided to the master BMS 100, the master light emitting unit 310 and the master BMS 100 may be connected to each other.

As still another example, the master BMS 100 may have a pin that may be connected to the communication module 300, and the communication module 300 may have an insert terminal into which the pin of the master BMS 100 may be inserted.

In addition, the communication module 300 may be configured to electrically connect one end of the slave light receiving unit 320 and one end of the slave BMS 200 when being attached to the battery pack.

As in the former example, as the pin of the communication module 300 may be attached to the battery pack by being inserted into the insert terminals provided on the substrate of the battery pack. In addition, as the pins of the communication module 300 are inserted into the insert terminals provided on the substrate of the battery pack, the slave BMS 200 and the slave light receiving unit 320 may be connected.

As another example, the slave BMS 200 and the slave light receiving unit 320 may be connected as the communication module 300 is fixedly coupled to the coupling member of the battery pack and the pin of the communication module 300 is directly inserted into the insert terminal provided to the slave BMS 200.

As still another example, the slave BMS 200 and the slave light receiving unit 320 may be connected to each other as the pin provided to the slave BMS 200 is directly inserted into the insert terminal provided to the communication module 300.

That is, in the battery pack according to an embodiment of the present disclosure, the communication module 300, the master BMS 100 and the slave BMS 200 may be connected simply by attaching the communication module 300 to the battery pack. Accordingly, the process of connecting the communication module 300 and the master BMS 100 and connecting the communication module 300 and the slave BMS 200 may be greatly simplified, and the time required for the connection may be saved. Therefore, replacement and maintenance of the communication module 300 may be made very easily.

The slave BMS 200 may be provided in plural inside the battery pack. Specifically, the structure where a plurality of slave BMSs 200 are included in the battery pack will be described with reference to FIG. 2.

Figure 2:
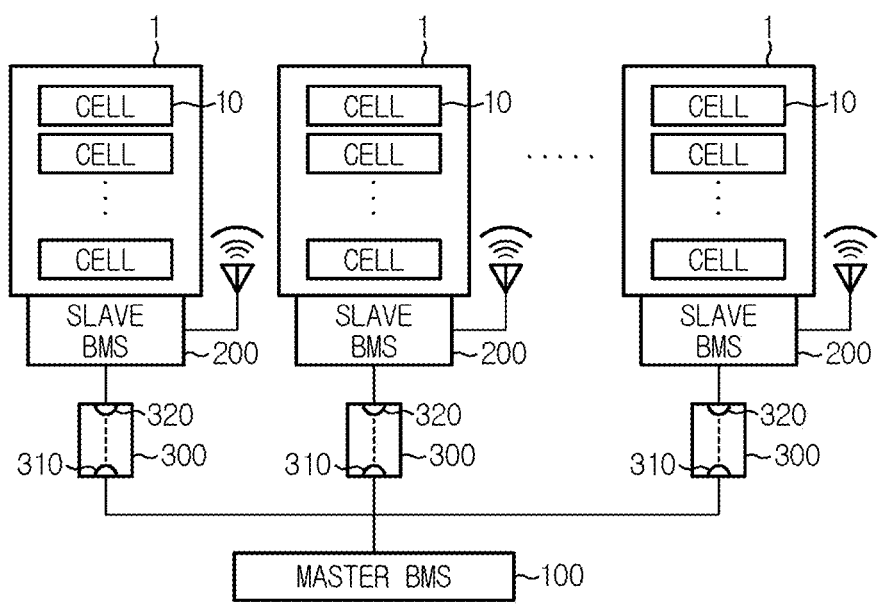
FIG. 2 is a diagram schematically showing a configuration of a battery pack according to another embodiment of the present disclosure.

FIG. 2 is a diagram schematically showing a configuration of a battery pack according to another embodiment of the present disclosure.

Referring to FIG. 2, the battery pack may include a plurality of slave BMSs 200. In this case, each of the plurality of slave BMSs 200 may perform charge/discharge control, smoothing control, switching, electrical characteristic value measurement and monitoring, error indication, on/off control, SOC estimation, or the like for the connected battery module 1. That is, the battery pack may include a plurality of slave BMSs 200 and a plurality of battery modules 1.

In addition, each of the plurality of slave BMSs 200 and the master BMS 100 may communicate with each other. The plurality of slave BMSs 200 and the master BMS 100 may communicate with each other through the communication module 300.

The communication module 300 may be configured to include at least one master light emitting unit 310, and a plurality of slave light receiving units 320 corresponding to the plurality of slave BMSs 200.

The at least one master light emitting unit 310 and each of the plurality of slave light receiving units 320 may communicate with each other. For example, one master light emitting unit 310 and each of the plurality of slave light receiving units 320 may communicate with each other. In addition, the plurality of master light emitting units 310 and the plurality of slave light receiving units 320 may be respectively matched to communicate with each other.

Preferably, the communication module 300 may include the same number of slave light receiving units 320 as the plurality of slave BMSs 200. However, here, both at least one master light emitting unit 310 and the plurality of slave light receiving units 320 may be included in one communication module 300. Alternatively, each communication module 300 may include one master light emitting unit 310 and one slave light receiving unit 320 in a pair.

The embodiment of FIG. 2 is an example in which one master light emitting unit 310 and one slave light receiving unit 320 are included in a pair in the communication module 300. Here, a plurality of unit communication modules may entirely form one communication module 300. However, hereinafter, for convenience of description, the unit communication module and the communication module 300 are not specifically distinguished but described just as the communication module 300.

The number of the slave light receiving units 320 and the master light emitting units 310 included in the communication module 300 may correspond to the number of the slave BMSs 200. Preferably, the number of the slave light receiving units 320 and the master light emitting units 310 may be the same as the number of slave BMSs 200. Further, the number of the slave light receiving units 320 and the master light emitting units 310 may correspond to the number of the battery modules 1 included in the battery pack.

In addition, in the embodiment of FIG. 2, the communication modules 300 may be replaced with each other. That is, the master light emitting unit 310 included in each communication module 300 may be connected to the master BMS 100, and the slave light receiving unit 320 may be connected to the slave BMS 200. That is, since the communication modules 300 that may be attached to the battery pack have the same specifications, the communication modules 300 may be replaced with each other.

Accordingly, since the battery pack according to an embodiment of the present disclosure may include the plurality of slave light receiving units 320, it is possible to form an optical communication line for connecting the master BMS 100 and each of the plurality of slave BMSs 200.

In addition, the master BMS 100 may individually transmit a first signal for changing the operation mode to each of the plurality of slave BMSs 200 based on the plurality of slave light receiving units 320. For example, it is assumed that the battery pack includes a first slave BMS 200, a second slave BMS 200, a third slave BMS 200, and a fourth slave BMS 200. The master BMS 100 may flicker the master light emitting unit 310 corresponding to the first slave BMS 200 and the third slave BMS 200 when it is intended to change the operation modes of only the first slave BMS 200 and the third slave BMS 200. In this case, among the plurality of slave light receiving units 320 included in the battery pack, only the slave light receiving units 320 corresponding to the first slave BMS 200 and the third slave BMS 200 may receive the first signal. Therefore, the operation modes of only the first slave BMS 200 and the third slave BMS 200 may be changed.

That is, the battery pack according to an embodiment of the present disclosure may easily change the operation mode of not only all of the plurality of slave BMSs 200 but also some of the plurality of slave BMSs 200.

The communication module 300 may include a plurality of master light emitting units 310 corresponding to the plurality of slave light receiving units 320.

Preferably, the communication module 300 may include the same number of slave light receiving units 320 and master light emitting units 310. In this case, each of the plurality of slave light receiving units 320 may communicate with one corresponding master light emitting unit 310. For example, each of the plurality of slave light receiving units 320 may communicate with a facing master light emitting unit 310.

The communication module 300 may be configured to further include a first barrier 350 disposed between the plurality of master light emitting units 310. Here, the first barrier 350 is to partition or separate the space of the communication module 300 and may be made to have a material and/or shape that preventing light from passing or refracting. The first barrier 350 included in the communication module 300 will be described with reference to FIG. 3.

Figure 3:
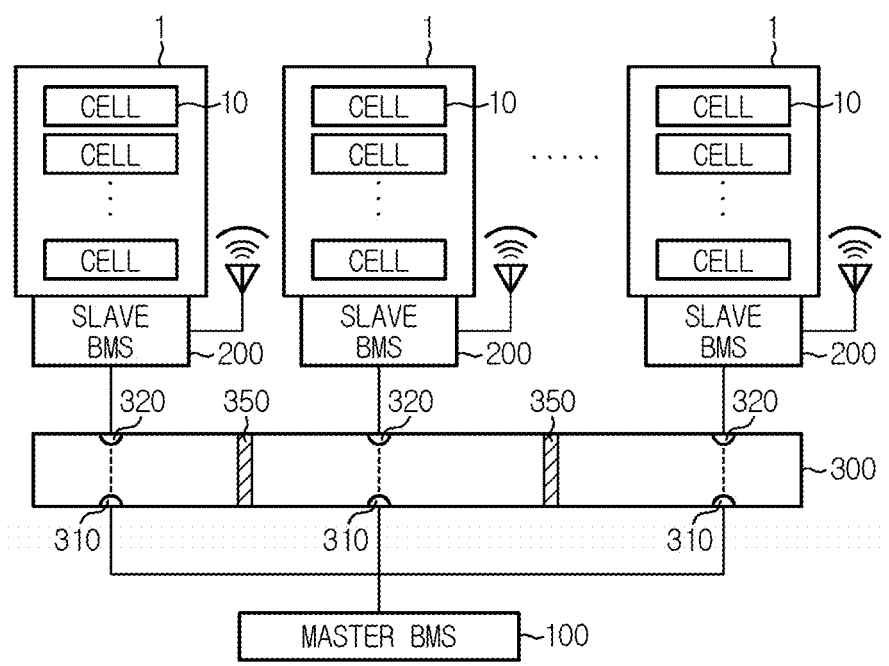
FIG. 3 is a diagram schematically showing a configuration of the battery pack according to another embodiment of the present disclosure, which includes another communication module.

FIG. 3 is a diagram schematically showing a configuration of the battery pack according to another embodiment of the present disclosure, which includes another communication module 300.

Referring to FIG. 3, the communication module 300 may not be configured as a set of a plurality of unit communication modules but be formed as one integrated module. In this case, the communication module 300 may include all of the plurality of master light emitting units 310 and the plurality of slave light receiving units 320 therein.

However, in the communication module 300 of FIG. 3, since the first signal (namely, light) output from the master light emitting unit 310 has scattering properties, the output first signal may be input not only to the slave light receiving unit 320 facing the master light emitting unit 310 but also to another non-facing slave light receiving unit 320.

Accordingly, since the communication module 300 further includes the first barrier 350 disposed between the plurality of master light emitting units 310, it is possible to prevent the first signal output from the not-facing master light emitting unit 310 to each of the plurality of slave light receiving units 320.

For example, in the embodiment of FIG. 3, it is assumed that the communication module 300 is configured to have a hexahedral shape and the hexahedral shape is elongated along one direction, for example a left and right direction. Among the inner surfaces of the communication module 300 (specifically, among the six surfaces), on the surface disposed toward the master BMS 100 (a lower inner surface in FIG. 3), the plurality of master light emitting units 310 may be disposed at predetermined intervals along the longitudinal direction (the left and right direction in FIG. 3). In addition, on the surface facing the surface toward the master BMS 100, namely on the surface toward the slave BMS 200 located on an opposite side (an upper inner surface in FIG. 3), the plurality of slave light receiving units 320 may be disposed at predetermined intervals along the longitudinal direction.

Preferably, for efficient communication, the plurality of master light emitting units 310 and the slave light receiving units 320 respectively corresponding thereto may be disposed to face each other. In addition, the first barrier 350 may be provided between the plurality of master light emitting units 310. That is, the first barrier 350 may have an area corresponding to a vertical cross section of the communication module 300 and divide the communication module 300 into a plurality of unit areas. That is, one master light emitting unit 310 and one slave light receiving unit 320 may be included in each of the plurality of unit areas. In this case, since the first signal output from the master light emitting unit 310 included in one unit area of the communication module 300 is not able to reach another unit area, it is possible to prevent communication interference by the first signal output from the non-corresponding master light emitting unit 310 in advance.

Therefore, since the battery pack according to an embodiment of the present disclosure may further include the first barrier 350, it is possible to prevent communication interference inside the communication module 300. Accordingly, there is an advantage that communication between the master BMS 100 and the plurality of slave BMSs 200 may be performed more accurately and quickly.

Figure 4:
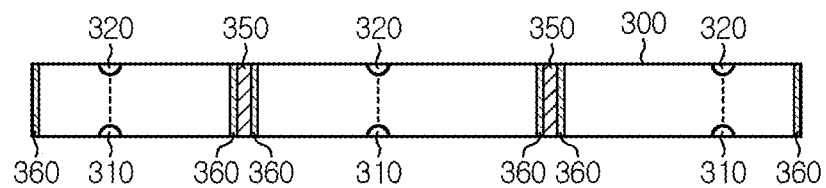
FIG. 4 is a diagram schematically showing a configuration of the communication module depicted in FIG. 3.

FIG. 4 is a diagram schematically showing a configuration of the communication module 300 depicted in FIG. 3.

Referring to FIG. 4, a reflection member 360 for reflecting light may be further provided to at least one of an inner wall of the communication module 300 and an outer wall of the first barrier 350.

For example, FIG. 4 shows an embodiment in which the reflection member 360 is provided to both of the inner wall of the communication module 300 and the outer wall of the first barrier 350. The reflection member 360 may be made of a material that reflects light, and may be formed in a plate-like structure or in other structures. For example, if the reflection member 360 is formed in a plate-like structure, the reflection member 360 may be attached to the inner wall of the communication module 300 and/or the outer wall of the first barrier 350.

If the reflection member 360 is further included in the communication module 300 as above, the signal (light) output from the master light emitting unit 310 may be reflected by the reflection member 360 and input to a corresponding slave light receiving unit 320. That is, since the reflection member 360 is provided in the communication module 300, light interception of the light receiving unit may be improved, and eventually communication efficiency between the master BMS 100 and the plurality of slave BMSs 200 may be improved.

Accordingly, the battery pack according to an embodiment of the present disclosure may facilitate replacement and maintenance of the master light emitting unit 310 and the slave light receiving unit 320 through the communication module 300 that is attachable to and detachable from the battery pack. In addition, since the first barrier 350 and the reflection member 360 are further included in the communication module 300, there is an advantage of preventing communication interference caused by scattering of light and remarkably improving optical communication efficiency.

Accordingly, based on the improved communication efficiency, the master BMS 100 may change the operation mode of each of the plurality of slave BMSs 200 while consuming system resources and power to the minimum.

The communication module 300 may further include a plurality of slave light emitting units 340 and a plurality of master light receiving units 330 to which a second signal output from a corresponding slave light emitting unit 340 among the plurality of slave light emitting units 340 is input, in the inside thereof.

Here, both the slave light emitting unit 340 and the master light receiving unit 330 are included in the communication module 300. For example, the slave light emitting unit 340 may be a light emitting element and the master light receiving unit 330 may be a light receiving element.

Similar to the structure of the slave light receiving unit 320 and the master light emitting unit 310 of the former embodiment, the slave light emitting unit 340 and the master light receiving unit 330 may be electrically connected to the battery pack if the communication module 300 is attached to the battery pack.

Figure 5:
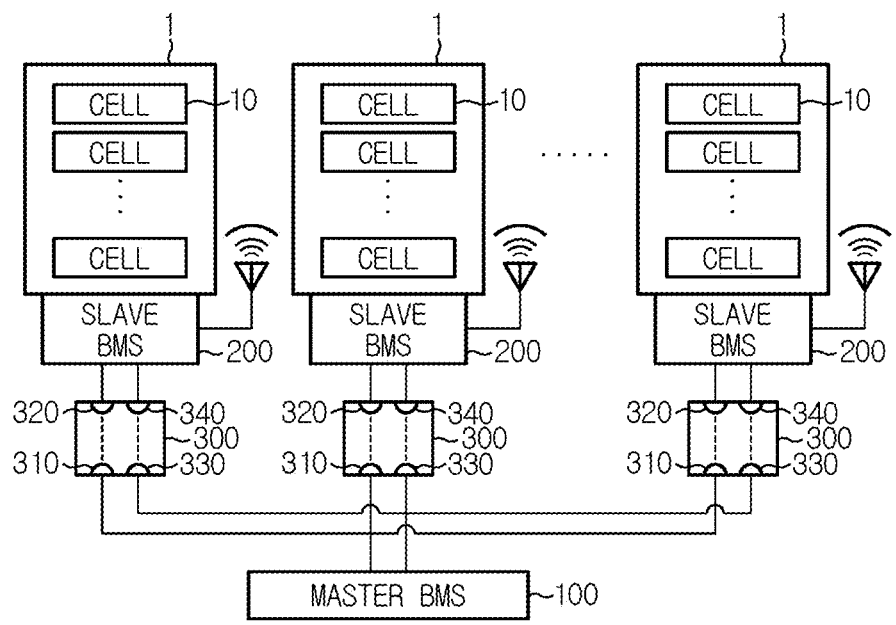
FIG. 5 is a diagram schematically showing a configuration of a battery pack according to still another embodiment of the present disclosure.

FIG. 5 is a diagram schematically showing a configuration of a battery pack according to still another embodiment of the present disclosure.

Referring to FIG. 5, the communication module 300 may further include a master light receiving unit 330 and a slave light emitting unit 340 as well as the master light emitting unit 310 and the slave light receiving unit 320. For example, the master light receiving unit 330 and the slave light emitting unit 340 may be disposed inside the communication module 300 to face each other. Accordingly, a signal (light) output from the slave light emitting unit 340 may be input to the master light receiving unit 330.

The plurality of slave BMSs 200 may be connected to corresponding slave light emitting units 340 among the plurality of slave light emitting units 340, respectively. That is, each of the plurality of slave light emitting units 340 may be electrically connected to a corresponding slave BMS 200.

In addition, the plurality of slave BMSs 200 may be configured to output the second signal by flickering the connected slave light emitting unit 340.

For example, the slave BMS 200 may output the second signal by flickering the connected slave light emitting unit 340 so as to correspond to outputting the first signal by flickering the master light emitting unit 310 connected to the master BMS 100.

Here, the second signal is defined according to a preset rule and may be a signal output through the slave light emitting unit 340 by flickering the slave light emitting unit 340 when the slave BMS 200 is in a faulty state.

In the embodiment of FIG. 5, each of the plurality of slave BMSs 200 may independently flicker the connected slave light emitting unit 340.

The master BMS 100 may be connected to the plurality of master light receiving units 330. That is, the plurality of master light receiving units 330 may be electrically connected to the master BMS 100.

Preferably, the number of the plurality of master light receiving units 330 and the plurality of slave light emitting units 340 may be the same.

The master BMS 100 may be configured to determine whether each of the plurality of slave BMSs 200 is in a faulty state depending on whether the second signal is input to each of the plurality of connected master light receiving units 330.

That is, if the master BMS 100 receives an electric signal corresponding to the second signal from the master light receiving unit 330 that has received the second signal, the master BMS 100 may determine that the slave BMS 200 corresponding to the master light receiving unit 330 that has received the second signal is in a faulty state.

The battery pack according to an embodiment of the present disclosure has an advantage of quickly transmitting a fault state of the slave BMS 200 to the master BMS 100 based on optical communication using the communication module 300 of a darkroom structure. In addition, since the master BMS 100 does not need to always open a wireless communication channel for receiving a signal from the slave BMS 200, resources required for communication between the master BMS 100 and the slave BMS 200 may be saved.

The communication module 300 may be configured to further include a second barrier 355 disposed between the plurality of master light emitting units 310 and the plurality of master light receiving units 330.

That is, the communication module 300 may further include a second barrier 355 between the master light emitting unit 310 and the master light receiving unit 330, as well as the first barrier 350 of the former embodiment. Here, the second barrier 355 may be made of a material that absorbs or reflects light so that light cannot pass therethrough, like the first barrier 350.

Figure 6:
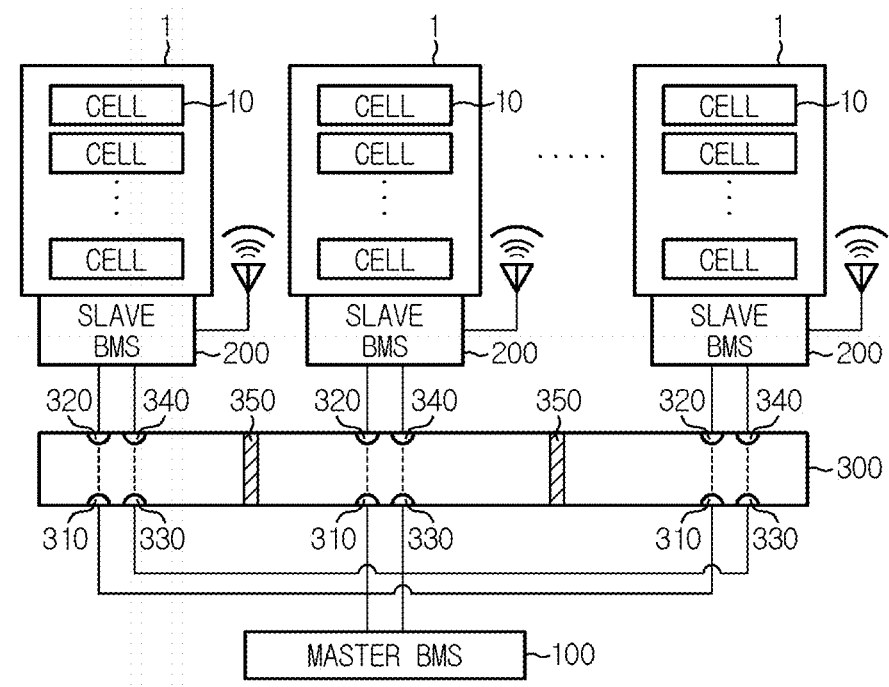
FIG. 6 is a diagram schematically showing a configuration of the battery pack according to still another embodiment of the present disclosure, which includes another communication module.

FIG. 6 is a diagram schematically showing a configuration of the battery pack according to still another embodiment of the present disclosure, which includes another communication module 300.

First, referring to FIG. 6, the battery pack may include an integrated communication module 300. That is, the battery pack may include a communication module 300 that has a plurality of master light emitting units 310, a plurality of slave light receiving units 320, a plurality of master light receiving units 330, and a plurality of slave light emitting units 340.

In addition, the battery pack may include the first barrier 350 disposed between the plurality of master light emitting units 310 in order to improve communication efficiency. In this case, based on the first barrier 350, the communication module 300 may be divided into unit areas. Accordingly, it is possible to prevent a signal output from any one master light emitting unit 310 from being input to a non-facing slave light receiving unit 320.

Figure 7:
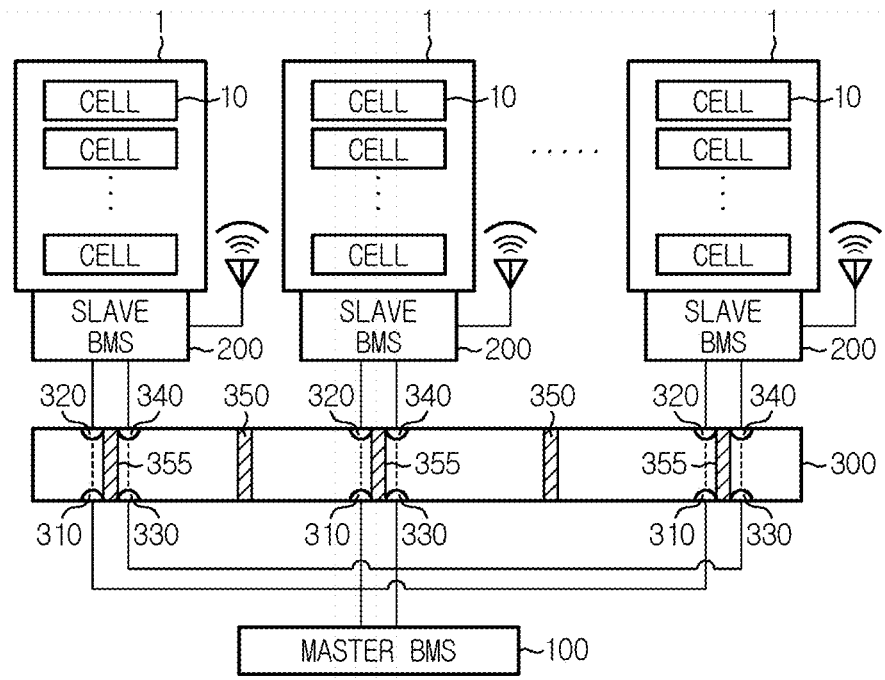
FIG. 7 is a diagram schematically showing a configuration of the battery pack according to still another embodiment of the present disclosure, which includes still another communication module.

FIG. 7 is a diagram schematically showing a configuration of the battery pack according to still another embodiment of the present disclosure, which includes still another communication module 300.

Referring to FIG. 7, the second barrier 355 may be further included in the communication module 300. Specifically, the second barrier 355 may be disposed between the master light emitting unit 310 and the master light receiving unit 330. That is, the second barrier 355 may be disposed between the slave light receiving unit 320 and the slave light emitting unit 340 corresponding to one slave BMS 200.

For example, in the structure of the communication module 300 of FIGS. 6 and 7, if the second barrier 355 is absent, the first signal output from the master light emitting unit 310 may be input to the master light receiving unit 330 or the second signal output from the slave light emitting unit 340 may be input to the slave light receiving unit 320. In addition, when the first signal output from the master light emitting unit 310 reaches the slave light emitting unit 340, the slave light emitting unit 340 may be damaged. Conversely, when the second signal output from the slave light emitting unit 340 reaches the master light emitting unit 310, the master light emitting unit 310 may be damaged. In order to solve this problem, the communication module 300 may further include the second barrier 355.

Therefore, referring to the embodiment of FIG. 7, each of the plurality of unit areas of the communication module 300 divided by the first barrier 350 may further include the second barrier 355 disposed between the master light emitting unit 310 and the master light receiving unit 330. Thus, the unit area of the communication module 300 divided by the first barrier 350 may be further divided by the second barrier 355.

Therefore, since the battery pack according to an embodiment of the present disclosure includes the first barrier 350 and the second barrier 355, it is possible to further improve communication efficiency.

Figure 8:
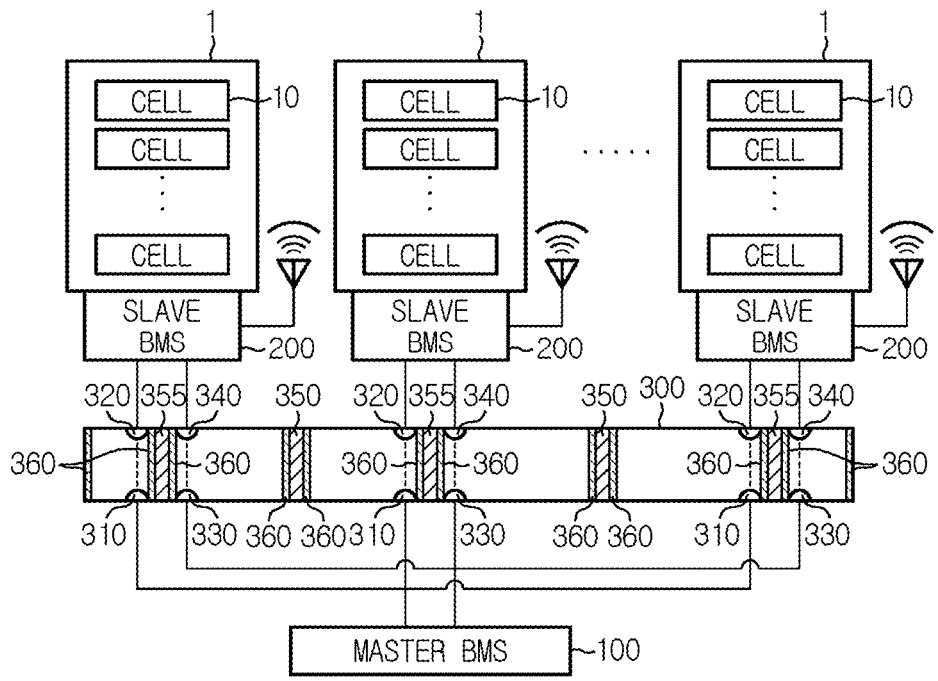
FIG. 8 is a diagram schematically showing a configuration of the battery pack according to still another embodiment of the present disclosure, which includes still another communication module.

FIG. 8 is a diagram schematically showing a configuration of the battery pack according to still another embodiment of the present disclosure, which includes still another communication module 300.

Referring to FIG. 8, a reflection member 360 for reflecting light to at least one of an inner wall of the communication module 300, an outer wall of the first barrier 350 and an outer wall of the second barrier 355 may be further included.

Specifically, the communication module 300 may be configured to further include the reflection member 360 disposed to at least one of the inner wall of the communication module 300, the outer wall of the first barrier 350 and the outer wall of the second barrier 355 to reflect light.

For example, as in the former embodiment, the reflection member 360 may be made of a material that reflects light, and may be formed to have a plate-like structure or other structures. For example, if the reflection member 360 is formed in a plate-like structure, the reflection member 360 may be attached to the inner wall of the communication module 300 and/or the outer wall of the first barrier 350 and/or the outer wall of the second barrier 355.

If the reflection member 360 is further included in the communication module 300 as above, the first signal (light) output from the master light emitting unit 310 may be reflected by the reflection member 360 and input to the corresponding slave light receiving unit 320. In addition, the second signal (light) output from the slave light emitting unit 340 may be reflected by the reflection member 360 and input to the corresponding master light receiving unit 330. That is, since the reflection member 360 is provided to the communication module 300, the light-receiving rates of the slave light receiving unit 320 and the master light receiving unit 330 may be improved, and eventually the communication efficiency between the master BMS 100 and the plurality of slave BMSs 200 may be improved.

The communication module 300 may further include a plurality of slave light emitting units 340 corresponding to the plurality of slave BMSs 200.

That is, the communication module 300 may be configured to include at least one master light emitting unit 310 and may also include the plurality of slave light receiving units 320 and the plurality of slave light emitting units 340 corresponding to the plurality of slave BMSs 200.

In addition, the plurality of slave BMSs 200 may be connected to a corresponding slave light emitting unit 340 among the plurality of slave light emitting units 340.

Each of the plurality of slave BMSs 200 may be connected to at least one of the slave light receiving unit 320 and the slave light emitting unit 340. Specifically, each of the plurality of slave BMSs 200 may be connected to a corresponding slave light receiving unit 320 among the plurality of slave light receiving units 320 provided in the communication module 300, and may be connected to a corresponding slave light emitting unit 340 among the plurality of slave light emitting units 340 provided in the communication module 300.

Figure 9:
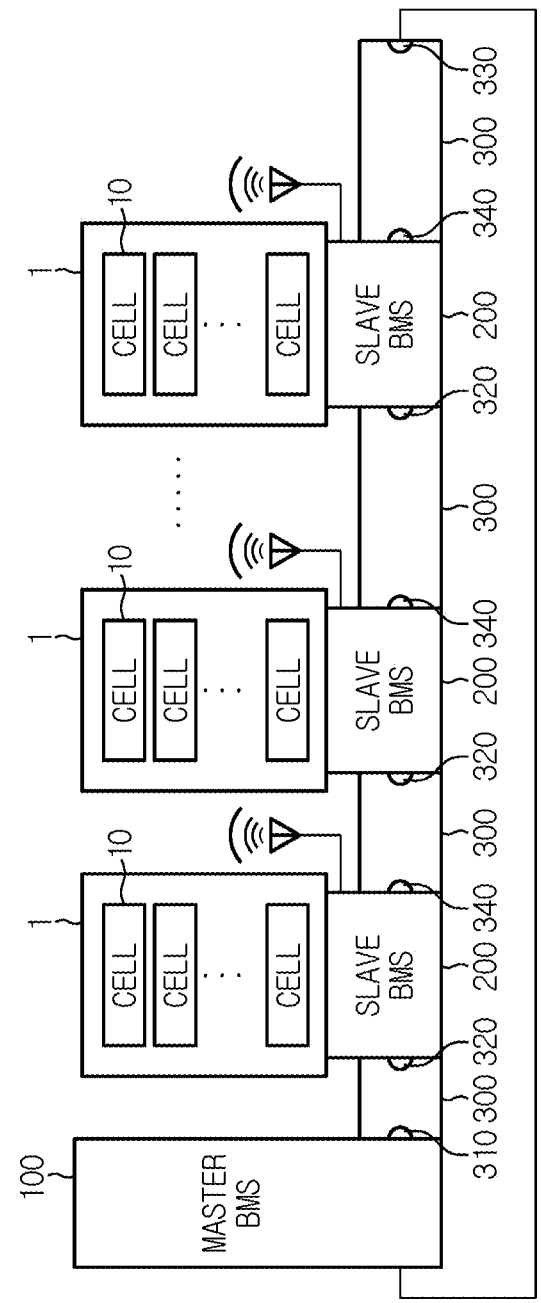
FIG. 9 is a diagram schematically showing a configuration of a battery pack according to still another embodiment of the present disclosure.
Figure 10:
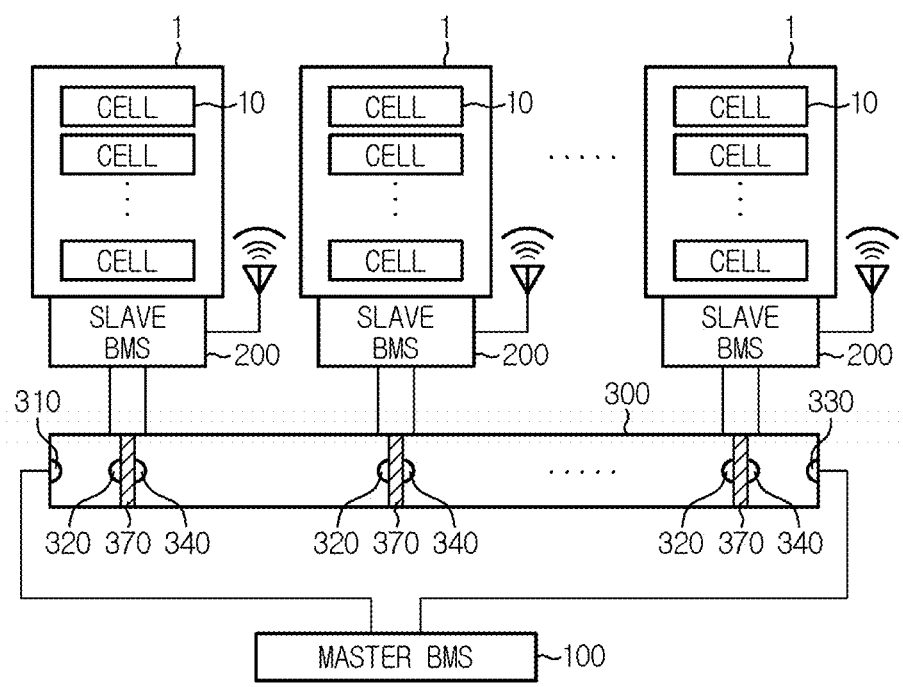
FIG. 10 is a diagram schematically showing a connection configuration of the battery pack according to still another embodiment of the present disclosure.

FIG. 9 is a diagram schematically showing a configuration of a battery pack according to still another embodiment of the present disclosure. FIG. 10 is a diagram schematically showing a connection configuration of the battery pack according to still another embodiment of the present disclosure.

Specifically, FIGS. 9 and 10 are diagrams schematically showing a configuration of the battery pack in which the master BMS 100 and the plurality of slave BMSs 200 are connected to the communication module 300.

For example, the battery pack may not have a structure in which the slave BMS 200 is disposed inside the communication module 300, but may have a structure in which the master BMS 100 and each of the plurality of slave BMSs 200 are connected to the communication module 300 as shown in FIG. 10. That is, the battery pack may have a structure in which the master BMS 100 and each of the plurality of slave BMSs 200 are connected to the communication module 300 integrally formed.

In the embodiment of FIGS. 9 and 10, the master BMS 100 may be connected to the master light emitting unit 310, and the plurality of slave BMSs 200 may be connected to a corresponding slave light receiving unit 320 and a corresponding slave light emitting unit 340. Here, the plurality of slave light receiving units 320 and the plurality of slave light emitting units 340 may be disposed on an outer surface of a third barrier 370 provided inside the communication module 300. The third barrier 370 may be configured to divide the inside of the communication module 300 and prevent a signal output from a non-corresponding light emitting unit from being input to the light receiving unit.

In this case, if the connected slave light receiving unit 320 receives the first signal, the plurality of slave BMSs 200 may be configured to change the operation mode and then output the first signal by flickering the connected slave light emitting unit 340.

That is, if the connected slave light receiving unit 320 receives the first signal, the plurality of slave BMSs 200 may first change the operation mode. For example, the operation mode may be changed from a sleep mode state to an awake mode state. After that, the slave BMS 200 whose operation mode is changed may flicker the connected slave light emitting unit 340 to output the first signal.

For example, if the master BMS 100 flickers the master light emitting unit 310 to output the first signal, the slave BMS 200 closest to the master BMS 100 may receive the first signal through the slave light receiving unit 320. In addition, the slave BMS 200 receiving the first signal may change the operation mode. In addition, the slave BMS 200 whose operation mode is changed may flicker the slave light emitting unit 340 to output the first signal. This process may be performed until all slave BMS 200s receive the first signal and change the operation mode.

The battery pack shown in FIGS. 9 and 10 may have a structure in which the operation mode may be sequentially changed from the slave BMS 200 adjacent to the master BMS 100. That is, the slave light emitting unit 340 and the slave light receiving unit 320 may be disposed to face each other in the communication module 300, and thus the battery pack may be configured such that the slave BMSs 200 communicate with each other.

For example, when the operation modes of the plurality of slave BMSs 200 included in the battery pack are all the sleep mode, if the master BMS 100 outputs the first signal through the master light emitting unit 310 to change the operation mode of the adjacent slave BMS 200, the operation modes of all slave BMS 200s may be sequentially changed from the sleep mode to the awake mode by communication between the slave BMSs 200.

Accordingly, the battery pack according to an embodiment of the present disclosure has an advantage of changing the operation states of the plurality of slave BMSs 200 included in the battery pack while consuming a minimum amount of resources of the master BMS 100.

The communication module 300 may be configured to further include a master light receiving unit 330 for receiving a signal output from a corresponding slave light emitting unit 340 among the plurality of slave light emitting units 340.

For example, referring to FIGS. 9 and 10, the communication module 300 may further include the master light receiving unit 330 disposed to face the corresponding slave light emitting unit 340 among the plurality of slave light emitting units 340.

The master BMS 100 may be configured to be connected to the master light receiving unit 330. Here, the master light receiving unit 330 may receive the signal output from the facing slave light emitting unit 340.

The master BMS 100 may flicker the master light emitting unit 310 to output the third signal and then diagnose the state of the communication module 300 depending on whether the third signal is input to the master light receiving unit 330. That is, the third signal may be a signal for diagnosing the state of the communication module 300. For example, the third signal may be a signal that flickers at a different period from the first signal and the second signal.

For example, in the embodiments of FIGS. 9 and 10, if the master BMS 100 flickers the master light emitting unit 310 to output the third signal, the slave light receiving unit 320 facing the master light emitting unit 310 may receive the third signal. The slave BMS 200 connected to the slave light receiving unit 320 receiving the third signal may change the operation mode and then output the third signal by flickering the slave light emitting unit 340.

After optical communication between the plurality of slave BMSs 200 is sequentially performed, the slave light emitting unit 340 corresponding to the master light receiving unit 330 may flicker to output the third signal. The outputted third signal may be input to the master light receiving unit 330, and the master BMS 100 may recognize that the third signal is input to the master light receiving unit 330. In this case, the master BMS 100 may diagnose that the communication module 300 is in a normal state. Specifically, the master BMS 100 may diagnose that all of the master light emitting unit 310, the plurality of slave light receiving units 320, the master light receiving unit 330 and the plurality of slave light emitting units 340 are in a normal state.

As another example, if the master BMS 100 flickers the master light emitting unit 310 to output the third signal and then does not recognize that the third signal is input to the master light receiving unit 330, the master BMS 100 may diagnose that the communication module 300 is in a faulty state. Specifically, the master BMS 100 may diagnose that at least one of the master light emitting unit 310, the plurality of slave light receiving units 320, the master light receiving unit 330 and the plurality of slave light emitting units 340 provided in the communication module 300 is in a faulty state.

That is, since the battery pack according to still another embodiment of the present application includes the communication module 300 having a structure capable of performing continuous and successive optical communication, it has an advantage of conveniently diagnosing the state of the communication module 300. Therefore, management of the communication module 300 may be more facilitated.

Meanwhile, the master BMS 100 may allocate identification information to each of the plurality of slave BMSs 200.

For example, in the embodiments of FIGS. 2, 3, 5 to 8, the master BMS 100 may sequentially flicker the connected master light emitting units 310 one by one to allocate identification information to each of the plurality of slave BMSs 200. Preferably, the master BMS 100 may sequentially allocate the identification information of the plurality of slave BMSs 200 based on a position where each of the plurality of slave BMSs 200 is mounted to the battery pack. Here, for the N number of slave BMSs 200, the identification information may include sequential number information from 1 to N.

Specifically, the master light emitting unit 310 flickered by the master BMS 100 may output the third signal. Here, the third signal may be a signal for allocating identification information to the slave BMS 200. The slave light receiving unit 320 corresponding to the master light emitting unit 310 outputting the third signal may receive the third signal output from the master light emitting unit 310. In addition, the slave light receiving unit 320 receiving the third signal may transmit an electric signal corresponding to the received third signal to the connected slave BMS 200. Accordingly, the identification information of the slave BMS 200 receiving the electric signal corresponding to the third signal may be allocated. After that, the master BMS 100 may sequentially flicker the remaining master light emitting units 310 to allocate identification information to each of the plurality of slave BMSs 200.

As another example, in the embodiment of FIG. 9, one master light emitting unit 310 may be included in the communication module 300. In this case, the master BMS 100 may flicker the master light emitting unit 310 to output the third signal. The slave light receiving unit 320 facing the master light emitting unit 310 may receive the outputted third signal, and the identification information of the slave BMS 200 connected to the slave light receiving unit 320 may be allocated. After that, the third signal may be output by flickering the slave light emitting unit 340 connected to the slave BMS 200 to which the identification information is allocated.

That is, the identification information of the slave BMS 200 may be sequentially allocated through optical communication between the slave BMSs 200. After the identification information of the slave BMS 200 provided at the last position in the arrangement structure is allocated, the slave BMS 200 may transmit its own identification information allocated by the master BMS 100. In this case, the slave BMS 200 may transmit its own identification information allocated from the master BMS 100 through wired or wireless communication. The master BMS 100 may terminate the allocation of identification information to the plurality of slave BMSs 200 by receiving the identification information allocated to the slave BMS 200 provided at the last position in the arrangement structure.

Therefore, the battery pack according to an embodiment of the present disclosure has an advantage of effectively allocating identification information to each of the plurality of slave BMSs 200 by using the communication module 300 even in an environment in which the master BMS 100 and the plurality of slave BMSs 200 are wirelessly connected.

In addition, the battery pack according to the present disclosure may serve as a component of a device or system including a load that receives power from the battery cell 10 or the battery module 1. Examples of the device include a vehicle, an electric vehicle (EV), a hybrid electric vehicle (HEV), an electric bicycle (E-Bike), a power tool, an energy storage system (ESS), an uninterruptible power supply (UPS), a portable computer, a portable phone, a portable audio device, a portable video device, and the like. Also, the load may be, for example, a motor that provides a rotational force by the power supplied by the battery, or a power conversion circuit that converts a power supplied by the battery into a power required for various circuit parts.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

1: battery module
10: battery cell
100: master BMS
200: slave BMS
300: communication module
310: master light emitting unit
320: slave light receiving unit
330: master light receiving unit
340: slave light emitting unit
350: first barrier
355: second barrier
360: reflection member
370: third barrier

What is claimed is:

1. A battery pack, comprising:
 a communication module configured to block light between an inside and an outside of the communication module, the communication module including a plurality of master light emitting devices and a plurality of slave light receiving devices, each of the slave light receiving devices being configured to receive a first signal output from a corresponding one of the master light emitting devices;
 a master battery management system (BMS) coupled to the plurality of master light emitting devices, the master BMS configured to control each of the plurality of master light emitting devices to output the first signal; and
 a plurality of slave BMSs coupled respectively to the plurality of slave light receiving devices, each of the slave BMSs configured to change an operation mode in response to a corresponding one of the slave light receiving devices receiving the first signal from the corresponding one of the master light emitting devices.

2. The battery pack according to claim 1, wherein the communication module is further configured to be attachable to and detachable from the master BMS and the plurality of slave BMSs of the battery pack.

3. The battery pack according to claim 2, wherein, when being attached to the battery pack, the communication module is further configured to:
 electrically connect one end of each of the plurality of master light emitting devices and one end of the master BMS; and
 electrically connect one end of each of the plurality of slave light receiving devices and one end of a corresponding one of the slave BMSs.

4. The battery pack according to claim 1, wherein the communication module further includes:
 a first barrier disposed inside the communication module and between the plurality of master light emitting devices,
 wherein the plurality of master light emitting devices and the plurality of slave light receiving devices are inside the communication module.

5. The battery pack according to claim 4, wherein:
 the communication module further includes:
  a plurality of slave light emitting devices each configured to output a second signal; and
  a plurality of master light receiving devices each configured to receive the second signal output from a corresponding slave light emitting device among the plurality of slave light emitting devices;
 each of the plurality of slave BMSs is connected to a corresponding slave light emitting device among the plurality of slave light emitting devices, each of the plurality of slave BMSs is further configured to output the second signal by flickering the connected corresponding slave light emitting device; and
 the master BMS is connected to the plurality of master light receiving devices, the master BMS being further configured to determine whether each of the plurality of slave BMSs has a failure depending on whether the second signal is input to a corresponding one of the plurality of connected master light receiving devices.

6. The battery pack according to claim 5, wherein the communication module further includes a second barrier disposed between one of the plurality of master light emitting devices and an adjacent one of the plurality of master light receiving devices.

7. The battery pack according to claim 6, wherein the communication module further includes a reflection member disposed to at least one of: an inner wall of the communication module, an outer wall of the first barrier, and an outer wall of the second barrier to reflect light.

8. The battery pack according to claim 1, wherein:
the communication module further includes a plurality of slave light emitting devices respectively corresponding to the plurality of slave BMSs, in the inside of the communication module; and
each of the plurality of slave BMSs is connected to a corresponding slave light emitting device among the plurality of slave light emitting devices, each of the plurality of slave BMSs being further configured to change the operation mode and then to output the first signal by flickering the connected corresponding slave light emitting device when the coupled one of the plurality of slave light receiving devices receives the first signal.

9. The battery pack according to claim 8, wherein:
the communication module further includes a master light receiving device configured to receive a signal output from a corresponding slave light emitting device among the plurality of slave light emitting devices; and
the master BMS is connected to the master light receiving device, the master BMS being further configured to output a third signal by flickering one of the master light emitting devices and then to diagnose a state of the communication module, depending on whether the third signal is input to the master light receiving device.

10. A vehicle, comprising:
a communication device configured to block light between an inside and an outside of the communication device, the communication device including:
a plurality of master light emitting devices; and
a plurality of slave light receiving devices, wherein each slave light receiving device is configured to receive light from a corresponding master light emitting device among the plurality of master light emitting devices;
a master battery management system (BMS) configured to control the plurality of master light emitting devices; and
a plurality of slave BMSs, wherein each slave BMS is configured to communicate with a corresponding slave light receiving device among the plurality of slave light receiving devices.

11. A battery pack, comprising:
a communication device configured to block light between an inside and an outside of the communication device, the communication device including:
a first master light emitting device;
a second master light emitting device;
a first slave light receiving device configured to interact with the first master light emitting device; and
a second slave light receiving device configured to interact with the second master light emitting device;
a master battery management system (BMS) distinct from the communication device, the master BMS configured to control the first master light emitting device and the second master light emitting device;
a first slave BMS distinct from the communication device, the first slave BMS configured to interact with the first slave light receiving device; and
a second slave BMS distinct from the communication device, the second slave BMS configured to interact with the second slave light receiving device.

* * * * *